United States Patent [19]

Selsing et al.

[11] Patent Number: 5,488,199
[45] Date of Patent: Jan. 30, 1996

[54] ELECTRICAL-STRESS-CONTROLLED SOLID DIELECTRIC CABLE TERMINATION ASSEMBLY

[75] Inventors: Jorgen Selsing, Oak Forest; Mac A. Thompson, Frankfort, both of Ill.

[73] Assignee: G & W Electric Company, Blue Island, Ill.

[21] Appl. No.: 763,187

[22] Filed: Sep. 20, 1991

[51] Int. Cl.$^6$ ................................................. H02G 15/103
[52] U.S. Cl. ........................ 174/73.1; 174/19; 174/140 R
[58] Field of Search ................................... 174/73.1, 142, 174/143, 87, 89, 19, 20, 140 R, 75 R, 85, 140 C, 140 CR; 406/214

[56] References Cited

U.S. PATENT DOCUMENTS

| | | | |
|---|---|---|---|
| 1,941,614 | 1/1934 | Meyer et al. | 173/353 |
| 2,174,377 | 9/1939 | Bowden et al. | 174/19 |
| 2,447,674 | 8/1948 | Strom et al. | 174/140 R X |
| 2,945,913 | 7/1960 | Conangla | 174/73.1 |
| 3,018,318 | 1/1962 | Franklin | 174/73.1 |
| 3,193,712 | 7/1965 | Harris | 307/147 |
| 3,484,679 | 12/1969 | Hodgson et al. | |
| 4,940,894 | 7/1990 | Morters | 250/324 |

FOREIGN PATENT DOCUMENTS

| | | | |
|---|---|---|---|
| 922779 | 12/1954 | Germany | 174/142 |
| 2712787 | 9/1977 | Germany | 174/73.1 |
| 3822288 | 1/1990 | Germany | 174/73.1 |
| 488059 | 8/1955 | Italy | 174/73.1 |
| 0895984 | 5/1962 | United Kingdom | 174/143 |

OTHER PUBLICATIONS

General Electric, Termi–Matic, Oct. 69, pp. 1–8.
Saito & Inaoka, New prefabricated accessories for 66–154 KV crosslinked polyethylene cables, Apr. 74, 224–232.

"New Cable Terminations for Solid Cable Systems 15 KV and Above", D. R. Heppner, R. B. Gear, IEEE Jun. 7, 1971, pp. 975–978.

Primary Examiner—Kristine L. Kincaid
Assistant Examiner—H. S. Sough
Attorney, Agent, or Firm—Laff, Whitesel, Conte & Saret, Ltd.

[57] ABSTRACT

An electrical-stress-controlled solid dielectric cable termination assembly having an electrical stress control device which comprises a metal conductor suitably shaped to achieve an electrical stress control function. A durable material having a high dielectric strength is applied as a coating to the exposed surfaces of the conductor. The coating prevents conductive particles or contaminants which may be present in an insulating fluid medium from directly contacting the stress control device. Even if such particles are attracted to the device, the particles will float at the prevailing electrical potential in the region and will therefore not cause increased electrical stress. In first and second embodiments of the invention, stress control cones for a joint and a termination, respectively, are formed from modified-cylindrically-shaped metal conductors. In a third embodiment, a corona shield is formed from a modified-cylindrically-shaped metal conductor. In some applications, a partially conductive shield layer of the cable is properly terminated in an electrical-stress-reducing configuration by applying a partially conductive sleeve pre-finished in the desired shape to overlap the shield layer. The pre-finished sleeve avoids the difficult task of suitably finishing the existing cable layer.

16 Claims, 7 Drawing Sheets

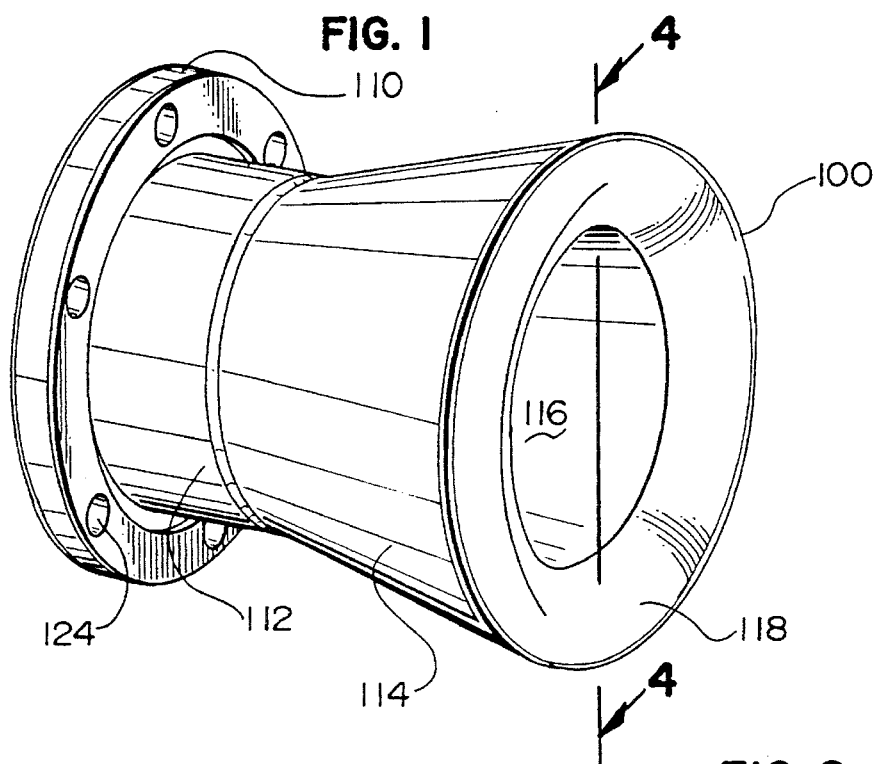
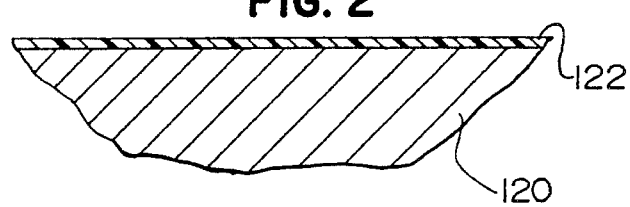
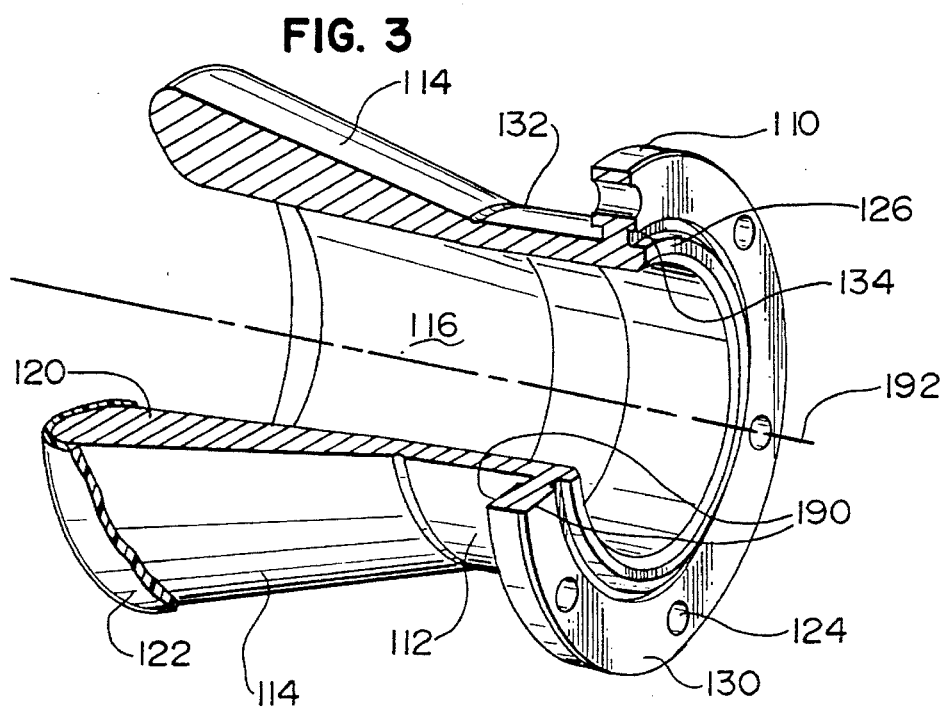

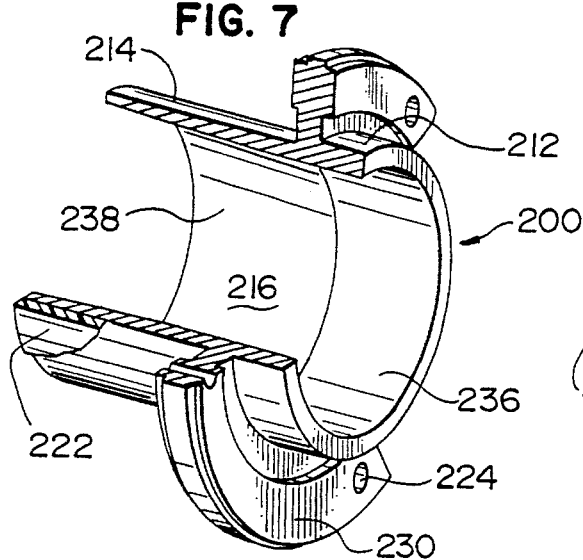
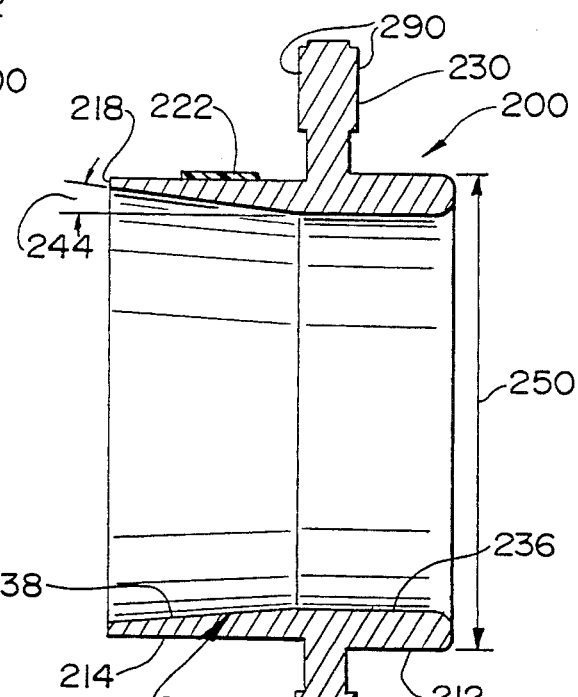
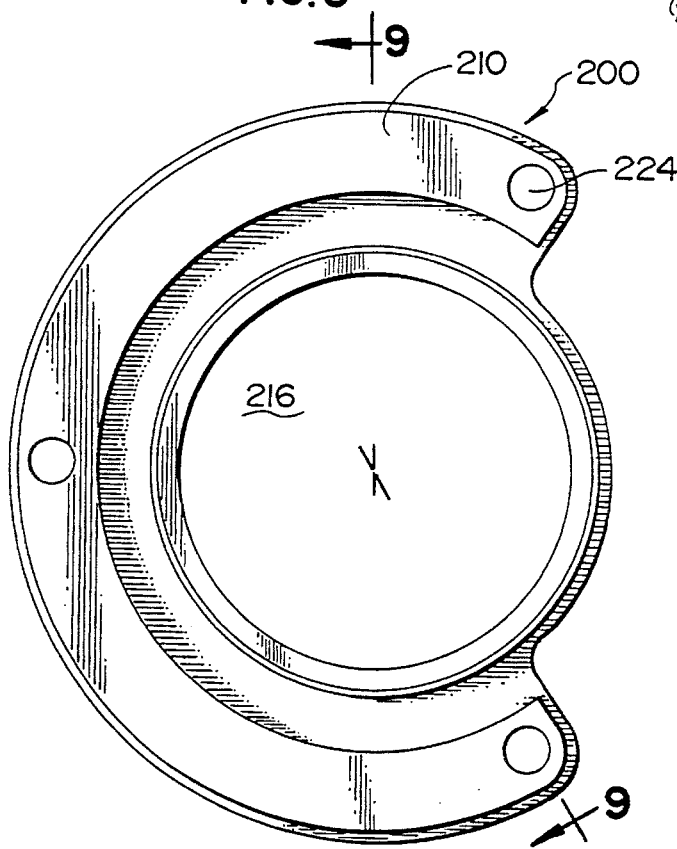

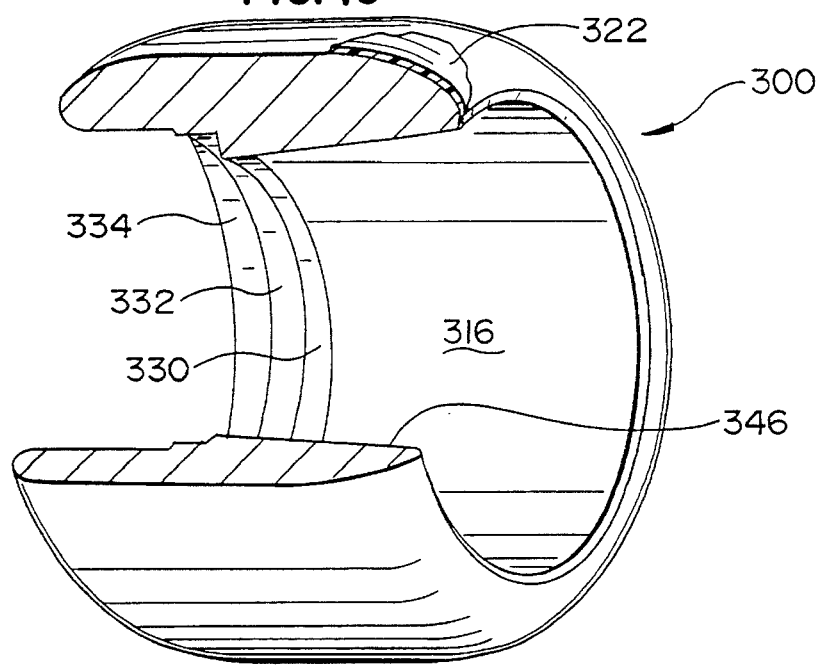
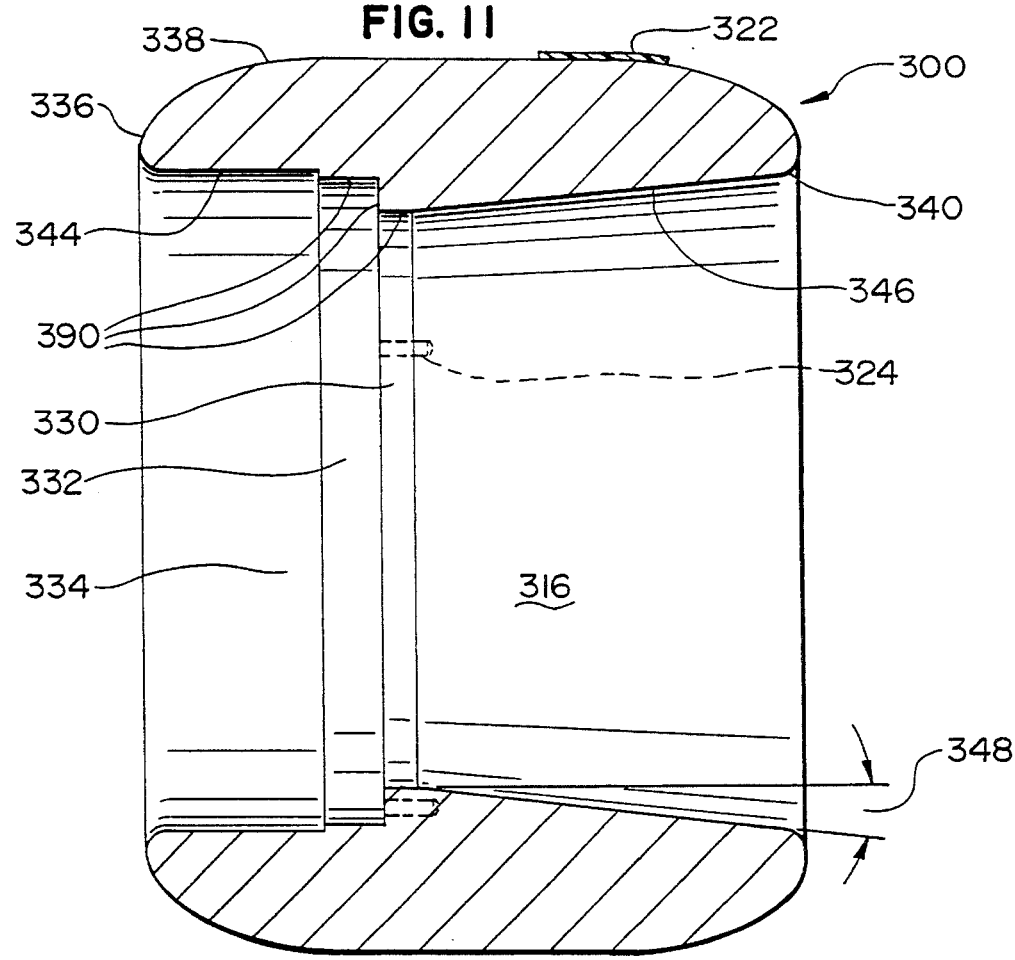

ELECTRICAL-STRESS-CONTROLLED SOLID DIELECTRIC CABLE TERMINATION ASSEMBLY

BACKGROUND OF THE INVENTION

This invention relates to electric power transmission and distribution equipment, and more particularly to devices for controlling the electric field in apparatus for terminating or joining certain types of electric power transmission cables.

Electric power is often transmitted at voltages exceeding 50 kV in order to reduce power losses caused by the resistance of the conductors. Traditionally, such high-voltage conductors have been suspended high above the ground from towers or other suitable supports in order to isolate them from the ground and from other objects where a high difference of potential would exist between the conductors and the objects. In such applications, the conductors are electrically insulated from the supports by suitable insulator apparatus, and from everything else by the air present in the region around the conductor. As is well known, an electric field surrounds the conductor. Because air has a relatively low dielectric strength, the conductors must be separated from other objects by a relatively large distance to prevent the electric field gradient in the region between the conductor and the object from exceeding dielectric strength of the insulating air.

The above-ground transmission of electric power via suspended conductors may be inappropriate for certain applications. In some cases, the requirement that the conductors be spaced far from other objects is inconsistent with existing or planned land use patterns. In other cases, aesthetic considerations preclude the use of the large towers or other supports required. One possible solution to this problem would be to locate air-insulated conductors underground in suitable vaults, but the need to maintain adequate physical separation between each conductor and other conductors and surrounding objects would require huge vaults and renders this solution economically infeasible.

For these and other reasons, systems have been designed to permit electricity to be transmitted at high voltages through suitable cables having configurations which do not require large physical spacing between the conductor and other objects. In one such cable configuration, a center conductor is surrounded by a layer of an appropriate solid dielectric material, such as polyethylene. The solid dielectric layer is, in turn, surrounded by a conductive shield. The center conductor, the solid dielectric, and the conductive shield are concentrically disposed. The center conductor has a substantially circular cross section. In order to avoid skin effect, the center conductor may comprise several groups of smaller conductor strands. Such groups are arranged as sectors of the circular center conductor cross section. The conductive shield may be formed as a tubular layer of partially conductive material having one or more drain conductors running along the outside surface of the layer. A corrugated metal tube or other suitable armor may be provided around the conductive shield to provide physical protection against damage to the cable.

The solid dielectric layer is formed from a suitable material having a high dielectric strength to minimize the distance required between the center conductor and the shield for a given operating voltage. This reduces the amount of material required to construct the dielectric layer and all other layers disposed radially outward from the dielectric layer. Accordingly, the weight, cost, and overall diameter of the cable is minimized.

Although the cable configuration described above provides a variety of advantages, special care must be taken when the cable is joined or terminated, because the high dielectric strength of the solid dielectric material permits a conductor-to-shield separation in the cable which is typically a small fraction of the separation required to prevent breakdown in air. When a cable is terminated (e.g. when it is desired to use the cable to feed an overhead line, or vice versa), the shield conductor must end. However, because the conductor-to-shield separation is small, an abrupt end to the shield causes large electrical stresses which would cause breakdown if not suitably controlled. A similar situation exists when it is necessary to join two cables together, because the shield conductor cannot conveniently be made continuous across the joint.

Accordingly, joints or terminations applied to solid-dielectric cables are typically immersed in a suitable container of insulating fluid (e.g. oil), having a high dielectric strength in order to reduce the separation required to avoid breakdown. In addition, conductor arrangements are chosen carefully to avoid sharp edges and other configurations which produce concentrations of electrical stress and thereby promote breakdown.

In the past, stress control cones have been constructed from conductive materials to help alleviate these problems. In one known design, a funnel-shaped metal casting is attached at its wider end to a larger-diameter epoxy cylinder. A partially conductive material is applied to at least a part of the inner wall of the epoxy cylinder and extends to contact the metal casting. An end of the cable to be protected is prepared by removing a length of the conductive shield to reveal the solid-dielectric insulation. The cable is inserted through the stress cone such that the shield ends within the cone, and the metal casting is electrically connected to the shield conductor. The partially conductive material forms an extension of the funnel-shaped metal casting, so that in effect, the diameter of the extended shield conductor is gradually increased through the metal casting and the partially conductive material. By gradually increasing the distance between the center conductor and the shield at the region where the shield terminates, the electric field gradient in that region, and the resulting electrical stress, are reduced.

However, stress cones constructed according to the prior art suffer from a variety of problems. It is difficult and expensive to manufacture the cast epoxy cylinders. Because air has a low dielectric constant, air-filled voids in the epoxy will permit breakdown. Certain contaminants may also affect the dielectric strength of the epoxy. Because it is difficult to prevent such voids and contamination from occurring, many castings must be rejected.

It is also difficult to securely join the epoxy cylinders to the metal castings. In joint applications, in which the longitudinal axis of the stress cone is typically disposed parallel to the ground, and in which the stress cones are subject to relatively large temperature variations, the castings may separate from one another, resulting in possible failure of the joint.

Another problem in manufacturing the prior art stress cones arises from the requirement that the conductive surface on the inside of the cone be extremely smooth. Because the seam which exists between the metal casting and the partially conductive material applied to the epoxy cylinder creates an inherent discontinuity in that surface, breakdown tends to occur at the seam. In addition, once the partially conductive material has been applied, a secondary machining operation is required to achieve the desired interior surface finish. The machining can cause the conductive material to chip or fracture, and therefore, still more assembled stress cones must be rejected.

Still another problem with the prior art stress cones is that the conductive metal casting and the partially conductive material are directly exposed to the insulating fluid. Contaminants in the fluid, and in particular metal particles suspended therein, are attracted to regions of high electrical stress and the adjacent conductors. When such a particle comes in contact with a conductor, it forms a sharp protrusion into the fluid. Such sharp protrusions cause concentrations of electrical stress which may exceed the dielectric strength of the fluid. In addition, such concentrations tend to attract other particles, resulting in progressively longer breakdown-promoting conductive chains.

Similar problems attend corona shields which are typically applied to the current carrying conductor to control the stress in a region near a part of the cable or an accessory thereto, which, due to its geometry, would tend to promote electrical breakdown if not so protected.

Other prior art stress control devices are known which comprise a conical metal conductor which is applied around a cable. The stress control device is then secured to the cable by applying a moldable potting compound in the interior of the conical conductor, producing a tight "interference" fit between the conical conductor and the shield or solid dielectric. A problem with these devices is that at elevated temperatures, they apply pressure to the cable which causes extrusion of the solid dielectric material, thereby undesirably reducing the distance between the center current-carrying conductor and the shield conductor, possibly causing a fault. In addition, once the solid dielectric material has been extruded from the interior of the cable, the interference fit between the stress cone and the cable is defeated.

OBJECTS AND SUMMARY OF THE INVENTION

It is therefore an object of the present invention to provide an electrical stress control device for solid dielectric cable transitions which may be manufactured as an integrated unit.

It is another object of the present invention to provide an electrical stress control device for solid dielectric cable transitions immersed in an insulating fluid which avoids contact with conductive particles or contaminants in the fluid.

It is a further object of the invention to provide an electrical stress control device for solid dielectric cable transitions in which essentially all structural parts are conductive.

It is still another object of the invention to provide an electrical stress control device for solid dielectric cable transitions which avoids extrusion of the dielectric from the cable.

It is another object of the invention to provide an electrical stress control device for solid dielectric cable transitions which lacks low-dielectric-constant voids.

An electrical stress control device for solid dielectric cable transitions constructed according to the present invention comprises a metal conductor suitably shaped to achieve an electrical stress control function. A durable material having a high dielectric strength is applied as a coating to the exposed surfaces of the conductor. The coating prevents conductive particles or contaminants which may be present in an insulating fluid medium from directly contacting the stress control device. Even if such particles are attracted to the device, the particles will float at the prevailing electrical potential in the region and will therefore not cause increased electrical stress. In first and second embodiments of the invention, stress control cones for a joint and a termination, respectively, are formed from modified-cylindrically-shaped metal conductors. In a third embodiment, a corona shield is formed from a modified-cylindrically-shaped metal conductor. In some applications, a partially conductive shield layer of the cable is properly terminated in an electrical-stress-reducing configuration by applying a partially conductive sleeve pre-finished in the desired shape to overlap the shield layer. The pre-finished sleeve avoids the difficult task of suitably finishing the existing cable shield layer.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 1 is a side perspective view of a first embodiment 100 of a stress control cone which is constructed according to the present invention and which may be used to control the electric field in a high-voltage cable joint;

FIG. 2 is a partial cross section of the stress control cone 100 of FIG. 1 showing a region including the surface thereof;

FIG. 3 is a partial side perspective view of the stress control cone 100 of FIG. 1 with a portion thereof removed to reveal a three-quarter cross section;

FIG. 7 is a three-quarter cross section view of a second embodiment 200 of a stress control cone which is constructed according to the present invention and which may be used to control the electric field in a high-voltage cable termination;

FIG. 8 is a bottom plan view of the stress control cone 200 of FIG. 7;

FIG. 9 is a cross section view of the stress control cone 200 taken along the view lines 9—9 of FIG. 8;

FIG. 10 is a three-quarter cross section view of an embodiment of a corona shield 300 which is constructed according to the present invention and which may be used to control the electric field in a high-voltage cable joint;

FIG. 11 is a cross section view of the corona shield 300 of FIG. 10;

DETAILED DESCRIPTION OF THE PREFERRED EMBODIMENT

Figure 4:
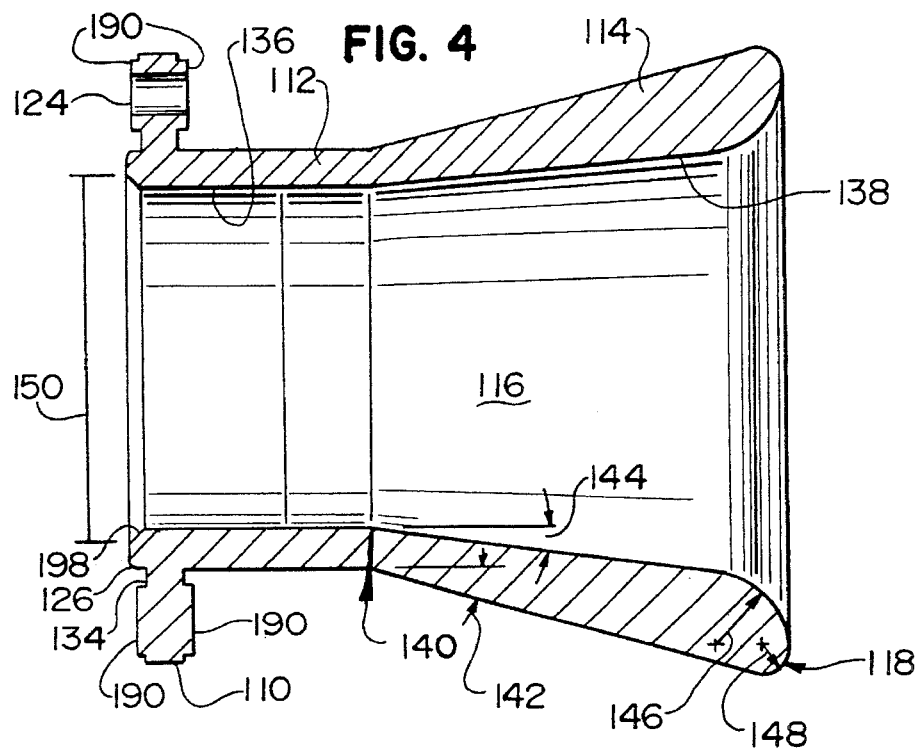
FIG. 4 is a diametric cross section view of the stress control cone 100 of FIG. 1 taken along the view lines 4—4 thereof.
Figure 5:
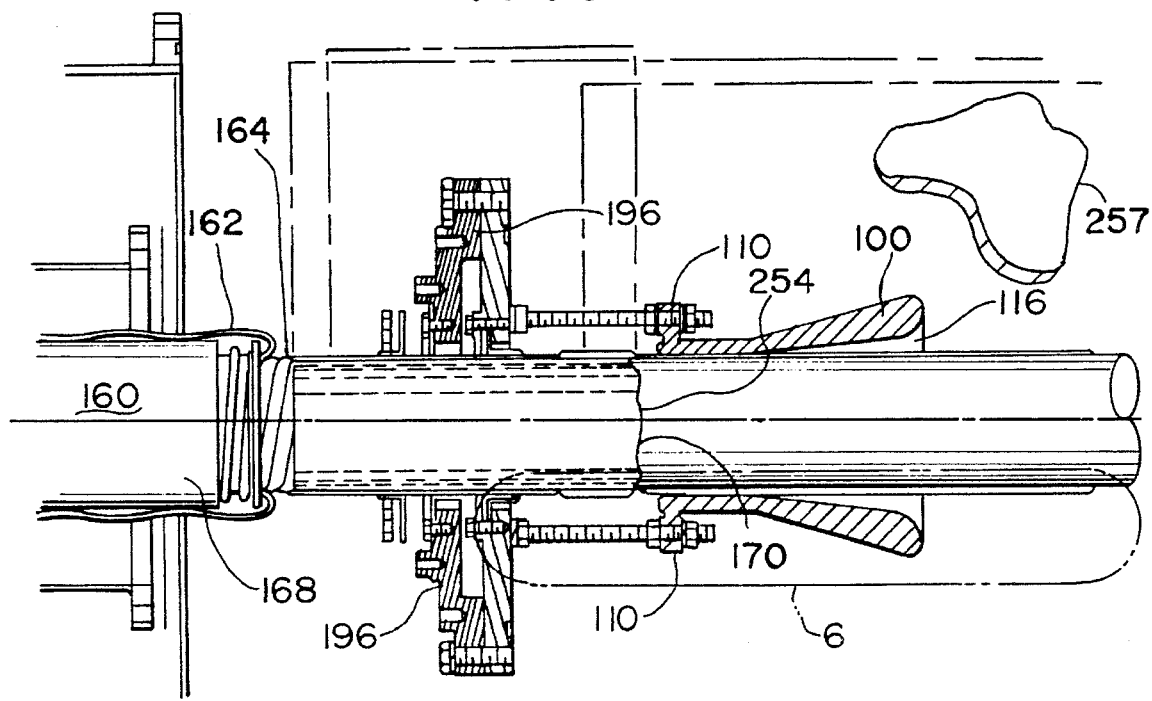
FIG. 5 is a cross section view of the stress control cone 100 shown applied to an exemplary high-voltage cable joint.

A first embodiment of a stress control cone 100 constructed according to the present invention and suitable for use in a joint for a solid-dielectric high-voltage cable is shown in FIGS. 1–6. The stress cone 100 is formed as a modified cylinder defining a central bore 116 aligned on a longitudinal axis 192 and adapted for receiving the cable 160 (FIG. 5). In normal use, the stress cone 100 and cable 160 are immersed inside an enclosure 252 filled with an appropriate high-dielectric strength fluid medium (not shown), which may be an insulating oil, an insulating gas, such as sulfur hexafluoride, or any other suitable medium. The stress cone 100 is electrically connected to the outer shield conductor 164 of the cable 160 and controls the electrical stress in that region of the cable joint apparatus in which the outer shield conductor is ended.

A first portion 112 of the stress cone 100 is formed by a "straight" wall—that is, the wall is substantially parallel to the axis 192. A second portion 114 of the cylinder is formed by a flared wall which is attached to the straight wall portion 112 at boundary 132 and has inner and outer diameters which increase as the wall extends from the straight wall portion 112. The outer edge 118 of the flared wall portion is preferably gently curved to avoid concentrations of stress around that edge which would occur if other geometries were used.

A flange 110 is attached to the straight wall portion 112 to provide a means for mounting the stress cone 100 in position in the joint. The flange 110 includes a bottom face 130, a ridge 126 formed as an extension of the inner wall of the straight wall section 112, and a circular channel 134 formed in the bottom face 130 adjacent ridge 126. The flange 110 preferably has a plurality of mounting apertures 124 through which appropriate fasteners 194 may be inserted to secure the stress cone 100 in a desired position.

The stress cone 100 is constructed of a suitable conductive material. Preferably, the stress cone is formed from aluminum or another appropriate conductive metal with additional finishing operations to form a smooth inner conductive surface. The smooth inner conductive surface avoids undesirable concentrations of electrical stress— which would occur if the surface had significant protrusions or voids extending from the surface.

An appropriate non-fluid dielectric coating 122 (FIGS. 2–3) is preferably applied to the finished surface of the stress cone 100. The coating 122 prevents conductive particles which may be present in the fluid insulating medium (not shown) from coming into direct contact with the conductive material from which the stress cone 100 is constructed. Although the strong electric field may cause such conductive particles to accumulate in the region of the stress cone 100, any such particles will be insulated from the conductive portion 120 of the stress cone by the dielectric coating 122. Accordingly, any of these particles will "float", or take on the electric potential which prevails in the insulating medium at the location of the particle. As a result, such conductive particles have little or no distortive effect on the electric field in the region near the stress cone, and therefore these particles do not act to concentrate electrical stress at their locations.

This is a significant advantage over prior art stress cones having conductive surfaces which are directly exposed to the fluid insulating medium. In such prior art stress cones, the conductive particles may directly contact the exposed surfaces and would thereby take on the potential of the stress cone itself. Since such particles necessarily protrude outward from the surface of the stress cone toward regions of different potential, they distort the electric field surrounding the particle. Such distortion concentrates electrical stress in the neighborhood of the particle, undesirably promoting electrical breakdown of the fluid insulating medium in that neighborhood. The non-fluid dielectric coating 122 thus avoids this significant disadvantage of prior art stress cones.

The non-fluid dielectric coating 122 may be formed from any appropriate dielectric material which may be applied to the finished surface of the stress cone 100. The coating 122 material selected is preferably one which durably adheres to the finished stress cone surface, has sufficient dielectric constant and dielectric strength to provide the desired insulation, and is compatible with the fluid insulating medium in which the stress cone 100 is immersed. An epoxy resin coating, available under the designation CORVEL ECA-1283 Coating Powder, from The Polymqer Corporation, P.O. Box 422 Reading, Pa. 19603, has been found to possess these characteristics and is suitable for use in this application. However, other dielectric materials could also be used.

The coating material 122 may be applied to the stress cone using any suitable method which provides a uniform coating of a desired thickness. For example, a fluidized-bed coating method may be used to apply a 0.015–0.040 inch thick coating of the aforementioned epoxy dielectric material from stock in powdered form. It is believed that an epoxy coating applied by the fluidized bed method is preferred because it provides an essentially void-free coating which strongly adheres to the conductive material from which the stress cone 100 is constructed. Voids in the coating are undesirable because they are typically filled by air. Since air has a relatively low dielectric strength compared to the coating material and to the surrounding fluid insulating medium, electrical breakdown is likely to occur within the void. However, other suitable coating methods could also be used.

Preferably, the coating material 122 is applied to the entire surface of the stress cone 100 except for one or more contact regions 190 (FIG. 4) on the attachment flange 110. The contact regions 190 are preferably free of the coating 122 so that these regions 190 may be used to electrically connect the stress cone to the shield conductor 164 (FIG. 5) of the cable 160.

Details relating to the preferred shape or contour of the inventive stress cone 100 are best seen in FIG. 4. The exact dimensions required for any particular embodiment of a stress cone constructed according to the present invention would depend on the diameter and operating voltage of the cable to be used. However, certain dimensions will be provided herein as an example of the dimensions appropriate for use with cable having a solid dielectric portion diameter of approximately 4.5 inches. The diameter 150 of the central bore 116 is preferably approximately 4.56 inches. A first inner wall section 136 corresponds to the "straight" wall portion 112 of the stress cone and extends substantially parallel to the longitudinal axis. A second inner wall section 138 preferably flares outward as it extends away from the first section 136 at an angle 144 of approximately 6 degrees. However, a gentle radius of approximately 20 inches preferably provides a smooth transition 140 between the first and second inner wall sections.

The outer wall of the flared wall portion 114 extends outward at an angle 142 of approximately 15 degrees. The outer edge 118 of the flared wall portion 114 is preferably rounded to avoid sharp corners which would cause concentrations of electrical stress. For example, the "corner" formed by the inner wall and the outer edge 118 is preferably rounded to a radius 146 of approximately 1.0 inch, while the corner formed by the outer wall is preferably rounded to a radius 148 of approximately 0.344 inches. The "corners" formed by the intersection of the interior and exterior walls with the ridge 126 are preferably also suitably rounded. It is believed that the improved shape of the inventive stress cone 100 results in a decrease in electrical stress of about 15 percent below the stress found at the seam in prior art designs.

Figure 6:
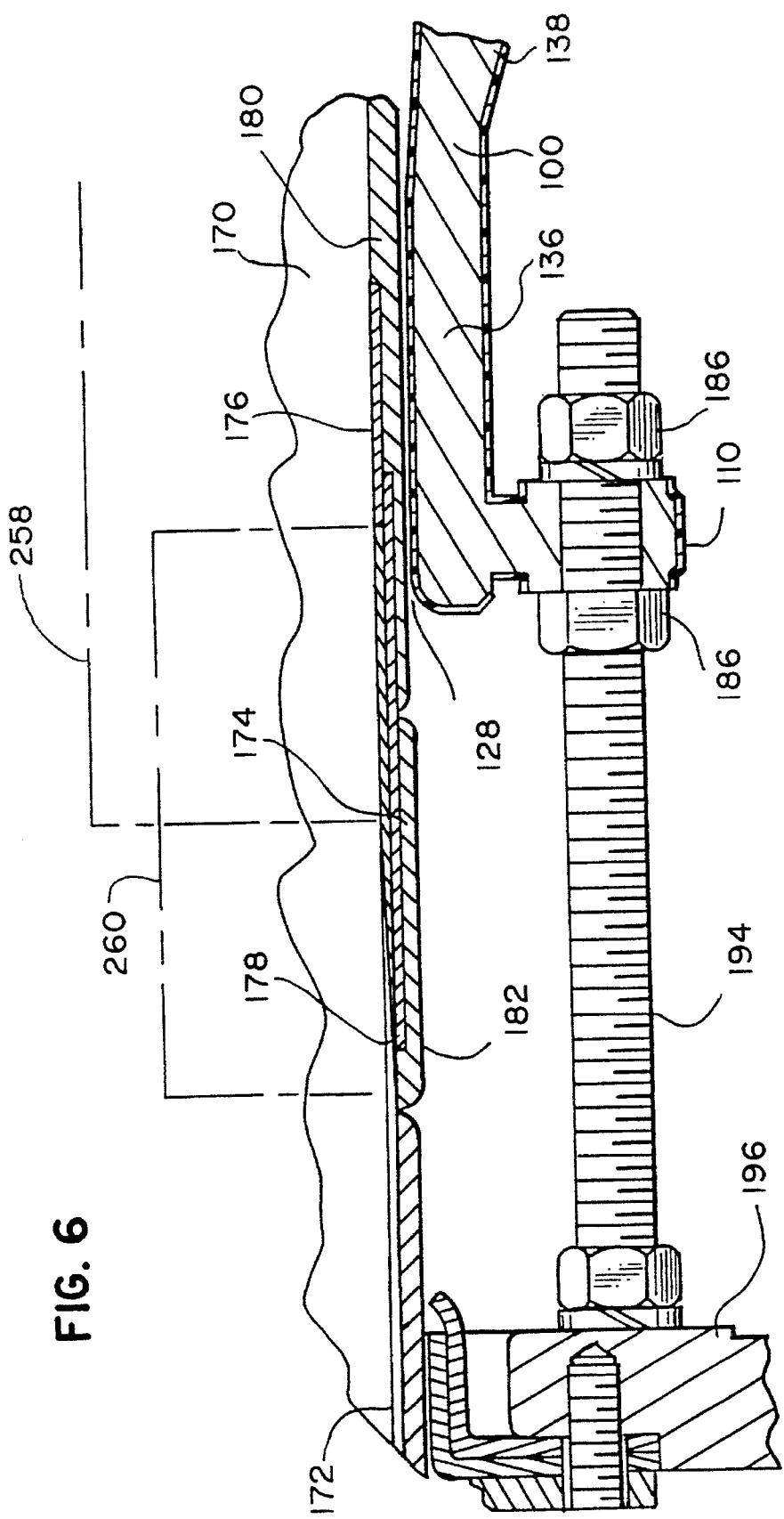
FIG. 6 is an enlarged cross section view of the stress control cone 100 showing a region bounded by the view line 6—6 of FIG. 5.

FIGS. 5–6 show the inventive stress control cone 100 applied to a cable joint connection apparatus. A high-voltage cable 160 of the type previously described comprises an external sheath 168, a plurality of drain conductors 162, a corrugated shield conductor 164 electrically connected to the drain conductors 162, a layer 172 of partially conductive material, and a solid dielectric insulating layer 170. The stress cone 100 is attached via flange 110 to suitable cable mounting means 196 using conventional fasteners 186, 194. The cable 160, with layers 168, 162, and 164 removed along a distance 256 (FIG. 5) from the cable end, extends through the central bore 116 of the stress cone 100. The inner diameter of the stress cone 100 is slightly larger than the outer diameter of the solid dielectric insulating layer 170 so that the stress cone does not mechanically interfere with the cable. This configuration defines an interstitial space 128. The stress cone 100 and cable 160 are immersed inside an enclosure filled with an appropriate insulating oil or other high-dielectric fluid medium (not shown).

In order to control the electrical stress produced by ending the shield conductor in the joint apparatus, it is desirable to avoid any sharp corners on conductive surfaces and to gradually increase the diameter of the shield conductor, or an extension thereof. Such a gradual increase in diameter near the end of the shield conductor or its extension increases the distance between the shield conductor and the center conductor 254 (FIG. 5) of the cable, thereby reducing the electric field gradient in that region.

Accordingly, the layer of partially conductive material 172 is provided by the cable manufacturer between the shield conductor 164 and the dielectric layer 170 of the cable 160 to provide a smooth inner conductive surface of substantially uniform diameter. The partially conductive layer 172 is removed along a distance 258 from the cable end. Because it is extremely difficult to uniformly finish the exposed end of the partially conductive layer 172, a first partially conductive sleeve 174 (FIG. 6) having a uniformly prefinished end is preferably applied to overlap the partially conductive layer 172 and extends toward the cable end along a distance 260. Thus, distance 260 is partially coextensive with distance 258. The end of layer 172 is preferably gradually feathered to a minimum thickness to provide a smooth transition between that layer and sleeve 174. A layer 176 of insulating tape is around the dielectric layer 170 adjacent the end of first sleeve 174. A second partially conductive sleeve 178 (FIG. 6) having a uniformly prefinished end is preferably applied to overlap both sleeve 174 and the insulating tape layer 176. The second sleeve 178 is preferably disposed within the straight portion 136 of the stress cone 100. Thus, the partially conductive layer 172, the first sleeve 174, the second sleeve 178, and the stress cone 100 cooperate to provide a conductive surface which effectively acts as an extension of the shield conductor 164 and which gradually increases in diameter near the end of that extension.

Figure 12:
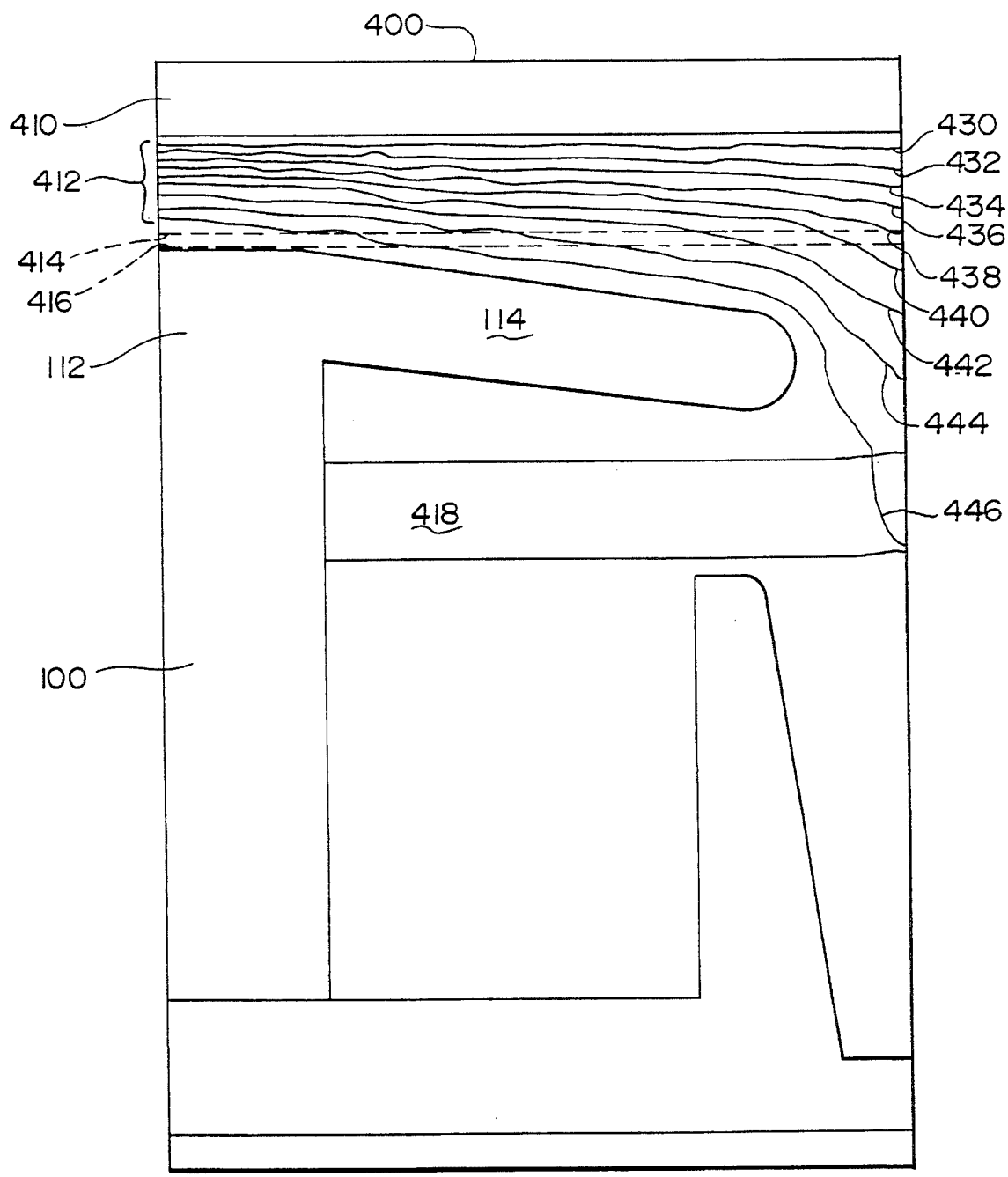
FIG. 12 is a diagram showing a representation of the electric field in a cable joint device including the stress control device 100 of FIG. 1.

FIG. 12 is a diagram 400 showing in cross-section a modeled representation of the electric field in a cable joint device including the stress control device 100 of FIG. 1. A high-voltage cable comprises a center conductor 410, a solid-dielectric layer 412, and a semi-conductive layer 414 connected to the grounded shield conductor (not shown). The stress control device 100 includes the straight wall portion 112 and the flared wall portion 114. An insulating structure 418 is mechanically attached to the stress cone 100. Lines 430, 432, 434, 436, 438, 440, 442, 444, and 446 represent equi-potential surfaces at intervals of one-tenth of the total potential difference between the center conductor 410 and the grounded shield conductor of the cable. Lines 430–446 are spread near the end of the flared wall portion 114. The reduction in density of lines 430–446 near the end of flared wall portion 114 indicates a reduction in electrical stress in this region.

Figure 13:
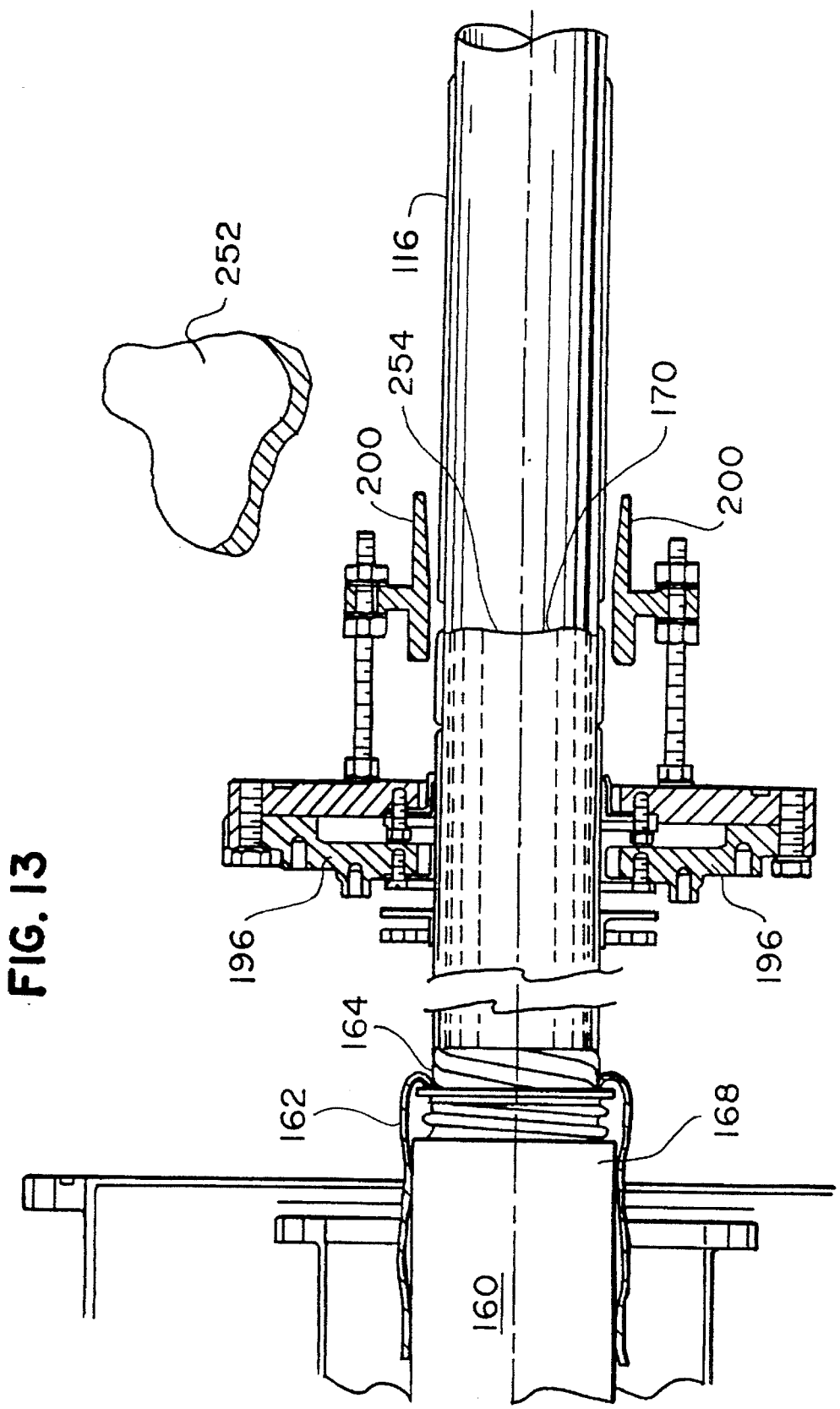
FIG. 13 is a cross section view of the stress control cone 200 shown applied to an exemplary portion of a high-voltage cable termination.

FIGS. 7–9 show a second embodiment 200 of a stress control cone which is constructed according to the present invention and which is suitable for use in a cable termination device. FIG. 13 is a cross section view of the stress control cone 200 shown applied to an exemplary portion of a high-voltage cable termination. The stress cone 200 of FIGS. 7–9 differs from the stress cone 100 of FIGS. 1–6 in that it is intended for use in an application in which an additional electric field control means (not shown) is provided by the termination device. Such additional electric field control means are well known in the art and, for example, may consist of a plurality of capacitors electrically connected in series. The additional electric field control means in this second embodiment obviates the pronounced flaring of the external wall shown in stress cone 100.

Apart from the aforementioned distinction, stress control cone 200 is generally similar to stress control device 100. Stress control cone 200 is formed as a modified cylinder defining a central bore 216 adapted for receiving a suitable high-voltage cable, which may be the cable 160 of FIG. 6. In normal use, the stress cone 200 and cable 160 are immersed inside an enclosure filled with an appropriate insulating oil or other high-dielectric fluid medium (not shown). The function of stress cone 200 is to control the electrical stress in that region of the cable termination apparatus in which the outer shield conductor is ended.

A first portion 212 of the stress cone 200 has an inner wall 236 disposed substantially parallel to the central axis of the bore 216. A second portion 214 of the cylinder has a flared interior wall 238 and is attached to the straight wall portion 212. The flared interior wall has an inner diameter which increases as the wall extends from the straight wall portion 212. The outer edge 218 of the flared wall portion is preferably gently curved to avoid concentrations of stress around that edge which would occur if other geometries were used.

A flange 210 is attached to the straight wall portion 212 to provide a means for mounting the stress cone 200 in position in the termination. The flange 210 includes a bottom face 230. The flange 210 preferably has a plurality of mounting apertures 224 through which appropriate fasteners (not shown) may be inserted to secure the stress cone 200 in a desired position.

The stress cone 200 is constructed of a suitable conductive material. Preferably, the stress cone is formed from aluminum or another appropriate conductive metal with additional finishing operations to form a smooth inner conductive surface. An appropriate non-fluid dielectric coating 222 is preferably applied to the finished surface of the stress cone 200. The dielectric coating 222 may be the material described for coating the stress cone 100 of FIGS. 1–6, and the material may be applied using the methods discussed above. Preferably, the coating material 222 is applied to the entire surface of the stress cone 200 except for one or more contact regions 290 (FIG. 9) on the attachment flange 210. The contact regions 290 are preferably free of the coating 222 so that these regions 290 may be used to electrically connect the stress cone to the shield conductor (not shown) of the cable.

The first inner wall section 236 extends substantially parallel to the longitudinal axis. A second inner wall section 238 preferably flares outward as it extends away from the first section 236 at an angle 244 of approximately 6 degrees. However, a gentle radius of approximately 20 inches preferably provides a smooth transition 240 between the first and second inner wall sections.

FIGS. 10–11 show a preferred embodiment of a corona shield 300 which is constructed according to the present invention and which is intended for use in controlling the electric field in a high-voltage cable joint. In contrast to the previously described stress control cones 100, 200, which were designed to be connected to the grounded shield conductor of a high-voltage cable, the corona shield 300 is designed to be connected to the center, current-carrying conductor of such a cable. The corona shield is intended to control the electric field in a region near a part of the cable or an accessory thereto, which, due to its geometry, would tend to promote electrical breakdown if not so protected.

Corona shield 300 has a modified cylinder shape defining a central bore 316 in which an object to be protected, such as a cable portion or an accessory thereto, may reside. The central bore 316 has first, second, and third cascaded straight-walled sections 330, 332, 334 having decreasing diameters approaching the interior of the bore. The central bore 316 also has a flared wall section 346 having a decreasing diameter approaching the interior of the bore until meeting the narrowest of the straight-walled sections 330.

The flared wall section 346 preferably flares outward at an angle 348 of approximately 6 degrees. The exterior tip 340 formed by the flared wall section 346 and the exterior wall 338 is preferably rounded to avoid sharp corners which would cause concentrations of electrical stress. The exterior tip 336 formed by the straight wall section 344 and the exterior wall 338 is preferably similarly rounded. A plurality of mounting channels 324 are preferably provided in bore 316 to receive fasteners (not shown) to electrically and mechanically attach the corona shield 300 to the object to be protected.

The corona shield 300 is constructed of a suitable conductive material. Preferably, the corona shield is formed from aluminum or another appropriate conductive metal with additional finishing operations to form a smooth conductive surface. An appropriate non-fluid dielectric coating 322 is preferably applied to the finished surface of the corona shield 300. The dielectric coating 322 may be the material described for coating the stress cone 100 of FIGS. 1–6, and the material may be applied using the methods discussed above. Preferably, the coating material 322 is applied to the entire surface of the corona shield 200 except for one or more contact regions 390 within the bore. The contact regions 390 are preferably free of the coating 322 so that these regions 390 may be used to electrically connect the corona shield to the object to be protected.

The above-described embodiment of the invention is merely one example of a way in which the invention may be carried out. Other ways may also be possible, and are within the scope of the following claims defining the invention.

What is claimed is:

1. An electrical-stress-controlled solid dielectric cable termination assembly comprising:

an electrical cable;

said electrical cable including a center conductor, a solid dielectric insulating layer arranged concentrically around said conductor, a partially conductive layer arranged concentrically around said solid dielectric insulating layer, and a shield conductor arranged concentrically around said partially conductive layer;

a substantially cylindrical electrically conductive wall;

said conductive wall forming a central bore for receiving said center conductor;

said conductive wall being electrically connected to said shield conductor;

and an insulating coating applied to said conductive wall;

said conductive wall having a thickness and said insulating coating having a thickness which is substantially consistent and substantially smaller than said conductive wall thickness;

said conductive wall having a central longitudinal axis;

said wall having a first portion having inner and outer walls substantially parallel to said axis; and said wall having a second portion attached to said first portion, said second portion having at least one wall inclined to said axis.

2. The assembly of claim 1 wherein said second portion comprises an inner wall extending from said first portion, said inner wall increasing in diameter as it extends from said first portion.

3. The assembly of claim 1 wherein said second portion comprises an outer wall extending from said first portion, said outer wall increasing in diameter as it extends from said first portion.

4. The assembly of claim 1 wherein said insulating coating has a substantially uniform dielectric constant.

5. An electrical-stress-controlled solid dielectric cable termination assembly comprising:

an electrical cable;

said electrical cable including a center conductor, a solid dielectric insulating layer arranged concentrically around said conductor, a partially conductive layer arranged concentrically around said solid dielectric insulating layer, and a shield conductor arranged concentrically around said .partially conductive layer;

a substantially cylindrical electrically conductive wall;

said conductive wall forming a central bore for receiving said center conductor;

said conductive wall being electrically connected to said shield conductor;

and an insulating coating applied to said conductive wall;

said conductive wall having a thickness and said insulating coating having a thickness which is substantially consistent and substantially smaller than said conductive wall thickness.

6. The assembly of claim 5 further comprising a flange attached to said wall and extending radially outward therefrom.

7. An electrical-stress-controlled solid dielectric cable termination assembly comprising:

an electrical cable;

said electrical cable including a center conductor, a solid dielectric insulating layer arranged concentrically around said conductor, a partially conductive layer arranged concentrically around said solid dielectric insulating layer, and a shield conductor arranged concentrically around said partially conductive layer;

a stress cone constructed of an electrically conductive material; and an insulating coating applied to said stress cone;

said stress cone forming a central bore for receiving said electrical cable;

said stress cone having a first wall portion, a second wall portion, and a transition joining said first and second wall portions;

said first wall portion having a first wall thickness;

said second wall portion extending away from said transition to define a distance from said transition;

said second wall portion having a second wall thickness which gradually increases with the distance from said transition.

8. An electrical-stress-controlled termination assembly comprising:

an electrical cable;

said electrical cable including a center conductor, a solid dielectric insulating layer arranged concentrically around said conductor, a partially conductive layer arranged concentrically around said solid dielectric insulating layer, and a shield conductor arranged concentrically around said partially conductive layer;

a stress cone constructed of an electrically conductive material; and an insulating coating applied to said stress cone;

said stress cone having a thickness and said insulating coating having a thickness which is substantially consistent and substantially smaller than said stress cone thickness;

said stress cone forming a central bore for receiving said cable;

said stress cone being electrically connected to said shield conductor;

said stress cone having a first wall portion, a second wall portion, and a transition joining said first and second wall portions;

said first wall portion having a first wall thickness;

said second wall portion extending away from said transition to define a distance from said transition;

said second wall portion having a second wall thickness which gradually decreases with the distance from said transition.

9. The assembly of claim 8 wherein:

said first wall portion is substantially cylindrical;

said first wall portion defines a longitudinal axis; and said second wall portion has at least one wall surface which is inclined to said axis.

10. The assembly or claim 9 wherein said first and second wall portions are integrally formed.

11. The assembly of claim 8 wherein said insulating coating has a substantially uniform dielectric constant.

12. The assembly of claim 8 wherein:

said shield conductor is removed from said cable along a first longitudinal region thereof;

said partially conductive layer is removed from said cable along a second longitudinal region thereof; and said assembly further includes a first partially conductive sleeve applied to said cable along at least a portion of said second longitudinal region.

13. The assembly of claim 12 wherein said stress cone is at least partially coextensive with said second longitudinal region.

14. The assembly of claim 12 wherein said stress cone is at least partially coextensive with said first partially conductive sleeve.

15. The assembly of claim 12 wherein said first partially conductive sleeve is at least partially coextensive with said partially conductive layer.

16. The assembly of claim 12 further comprising; a second partially conductive sleeve applied to said cable along a portion of said second longitudinal region, said second partially conductive sleeve being at least partially coextensive with said first partially conductive sleeve.

* * * * *